Patented Feb. 22, 1944

2,342,399

UNITED STATES PATENT OFFICE 2,342,399

MANUFACTURE OF CELLULOSE ESTERS CONTAINING HIGHER ACYL GROUPS

Gordon D. Hiatt and Carlton L. Crane, Rochester, N. Y., assignors to Eastman Kodak Company, Rochester, N. Y., a corporation of New Jersey No Drawing. Application May 31, 1941, Serial No. 396,160

5 Claims. (Cl. 260—227)

This invention relates to a process for recovering from their reaction mixtures cellulose esters substantially all of the acyl of which consists of fatty acid radicals of at least 10 carbon atoms by first treating the reaction mixture with acetic acid or acetone.

Only a few methods of preparing simple cellulose esters of the higher fatty acids, such as cellulose stearate, have been proposed in the prior art. For instance, the preparation of esters of this nature by treating cellulose with the acyl chloride of the higher fatty acid in the presence of pyridine and an inert solvent has been suggested. Other methods proposed are the treatment of cellulose with the anhydride of the fatty acid with a catalyst in the presence of an inert solvent and by the employing of the higher fatty acid with chloroacetic anhydride and a catalyst to impel the esterification of the cellulose. The only commercially feasible method of preparing cellulose esters in which substantially all of the acyl groups are fatty acid radicals of at least 10 carbon atoms is the last one mentioned, namely the one using an impelling anhydride, such as chloroacetic or an alkoxy acetic anhydride, in conjunction with the higher fatty acid and a catalyst. In carrying out this method, however, difficulties have been encountered in the separation of the cellulose ester from its reaction mixture. For example, when the cellulose ester is separated from its reaction mixture by pouring into water, the precipitated ester is contaminated with varying amounts of the free fatty acid, necessitating the refining of the ester. Also, the chloroacetic compounds present are ordinarily lost because of their corrosive action and instability in aqueous solutions.

An object of our invention is to provide a method of separating cellulose esters from the reaction dopes in which they are prepared without contaminating the cellulose ester with higher fatty acid. Another object of our invention is to provide a method of separating cellulose esters from their reaction mixture which makes possible recovery of the spent reagents. Other objects of our invention will appear herein.

We have found that cellulose esters, substantially all of the acyl of which consists of fatty acid radicals of at least 10 carbon atoms, may be satisfactorily and completely separated from the reaction mixture in which they were prepared by first treating with a large quantity of acetic acid or acetone so as to remove all the uncombined acid and then washing the resulting cellulose ester with water. By this means the uncombined higher fatty acid is removed and in addition, chloroacetic acid or anhydride is removed thereby without any corrosion, since the extraction solvent which is employed is anhydrous. When the cellulose ester reaction mixture is treated with the acetic acid or acetone, the cellulose ester is rendered insoluble either by direct precipitation or by formation of a gel-like product. If the product is gel-like in nature, the subsequent treatment of the ester with water coagulates the ester so that it is satisfactorily recovered in a soft fibrous condition. The extraction solvent, after the treatment of the cellulose ester, contains merely chloroacetic acid or anhydride, possibly some unused fatty acid and possibly a small proportion of catalyst so that both the extraction solvent and the chloroacetic acid may be readily recovered, such as by distillation. In some cases it may be desirable to add some acetic anhydride to the recovery liquor either to insure anhydrous conditions or to allow the chloroacetic acid to be taken off directly as the anhydride or both.

The cellulose esters with which this invention is particularly concerned are those in which substantially all of the acyl of the ester consists of fatty acid radicals of at least 10 carbon atoms. These esters are insoluble in various organic solvents including acetic acid and acetone and, therefore, may be treated without dissolving of the cellulose ester by the acetic acid or acetone. Some of the esters, which may be recovered in accordance with this invention, are cellulose stearate, cellulose palmitate, cellulose caprate, cellulose laurate, cellulose margarate and cellulose mixed esters of fatty acids of more than 10 carbon atoms, such as cellulose palmitate-stearate and cellulose laurate-stearate. In some cases a few per cent of a lower acyl may be present. However, it is desirable that the cellulose ester, treated in accordance with this invention, should contain no more than 5% of such lower fatty acid, particularly where the lower acyl is acetyl. If the lower acyl consists of radicals having a greater number of carbon atoms than acetyl, more of that lower acyl can be tolerated in the ester, recovered in accordance with this invention.

Although this invention is applicable to fully esterified esters it is also applicable to cellulose esters which are not fully esterified. Cellulose esters of the higher fatty acids are produced, which are uniformly soluble even though the amount of the higher fatty acid employed is less than the theoretical amount for complete esterification of the cellulose. For instance, amounts of higher fatty acid within the range of 70–99% of the theoretical have been used and useful products have been obtained. This invention applies to the treatment generally of the cellulose esters of the higher fatty acids in which cellulose is 70–100% esterified with higher fatty acid radicals.

The acetic acid or acetone or their mixture, whichever is used, should be substantially anhydrous as the presence of water causes both precipitation of the free fatty acid which may be present and also induces corrosiveness on the part of the chloroacetic acid. Therefore, if any water is present in the acetic acid or acetone, it should not be greater than an amount which will be destroyed by the chloroacetic acid anhydride present in the reaction mixture or by added anhydride. The solvent should be employed in a quantity sufficient to extract the uncombined higher fatty acid from the cellulose ester. This ordinarily will mean the use of at least a quantity of the solvent equal to the acid which is present in the reaction mass and at least two or three extractions, although with a greater number of extractions, the amount of extractant used in each one might be decreased or vice versa. In ordinary operations, however, the use of an excess of acetic acid or acetone in treating the cellulose ester is desirable. Extraction is preferably carried out by agitating the cellulose ester in the recovery solvent and then removing the liquid therefrom to as great an extent as possible. After the complete removal of uncombined acid, the ester is then thoroughly washed in water to remove the acetic acid or acetone therefrom. The following examples illustrate our invention:

*Example I*

A cellulose caprate was prepared using 4 pounds of cotton linters, 12.8 pounds of capric acid, 17 pounds of chloroacetic anhydride and an acylation catalyst such as sulfuric acid. The reaction dope was extracted with 50 pounds of acetic acid and the ester was then extracted with two successive additions of 25 pounds of acetic acid. Each time, the extraction solvent was drained from the thin, gel-like mass of cellulose caprate which floated thereon. After thoroughly extracting the uncombined acid from the ester, it was coagulated and washed with water to remove all the extraction solvent therefrom. The resulting product gave clear, light yellow dopes when dissolved in ethyl acetate. The extraction solvent, the chloroacetic acid and the excess chloroacetic anhydride could be recovered from the extraction liquid by distillation.

*Example II*

Five pounds of a reaction mass, resulting from the preparation of cellulose stearate with cotton linters, chloroacetic anhydride, stearic acid and an acylation catalyst, was treated with sodium acid carbonate to neutralize the catalyst and was then thoroughly mixed with 20 pounds of glacial acetic acid which precipitated the cellulose stearate. The acetic acid, which removed substantially all of the uncombined acid from the cellulose ester, was separated from the ester. The cellulose stearate was then washed in changes of distilled water consisting of five 2 hour changes at room temperature and fifteen 2 hour changes at 130° F. A cellulose stearate of good purity was obtained. The extraction liquor, after separation from the cellulose ester, was treated with 1.5 pounds of acetic anhydride and the solution was concentrated at reduced pressure. All of the acetic acid was recovered and over 50% of the chloroacetic acid of the reaction mixture was regained as the anhydride.

The cellulose esters resulting from the treatment described in the above examples had such a small residue of free fatty acid present therein that there was no necessity of using any extraction process thereon prior to employment in any connection in which their use was desired.

We claim:

1. A method of preparing cellulose esters substantially all of the acyl of which consists of fatty acid radicals of at least 10 carbon atoms, which comprises esterifying the cellulose with a reaction mixture essentially consisting of a fatty acid of at least 10 carbon atoms in an amount 70–100% of that theoretically necessary to esterify the cellulose, an impelling anhydride and an acylation catalyst and subsequently treating the esterification mass containing the cellulose ester under substantially anhydrous conditions with an organic liquid selected from the group consisting of acetic acid and acetone in sufficient amount to extract at least a substantial proportion of the uncombined higher fatty acid therefrom.

2. A process of preparing cellulose esters substantially all of the acyl of which consists of fatty acid radicals of at least 10 carbon atoms, which comprises esterifying the cellulose with an esterification mixture essentially consisting of chloroacetic anhydride, fatty acid of at least 10 carbon atoms in an amount 70–100% of that theoretically necessary to esterify the cellulose and an acylation catalyst and subsequently treating the esterification mass containing the cellulose ester under substantially anhydrous conditions with an organic liquid selected from the group consisting of acetic acid and acetone in sufficient amount to extract at least a substantial proportion of the uncombined fatty acid therefrom.

3. A method of preparing cellulose esters substantially all of the acyl of which consists of fatty acid radicals of at least 10 carbon atoms, which comprises esterifying the cellulose with a reaction mixture essentially consisting of a fatty acid of at least 10 carbon atoms in an amount 70–100% of that theoretically necessary to esterify the cellulose, chloroacetic anhydride and an acylation catalyst and subsequently treating the esterification mass containing the cellulose ester under substantially anhydrous conditions with acetone in a sufficient amount to extract at least a substantial amount in an uncombined fatty acid therefrom.

4. A method of preparing cellulose esters substantially all of the acyl of which consists of fatty acid radicals of at least 10 carbon atoms, which comprises esterifying the cellulose with a reaction mixture essentially consisting of a fatty acid of at least 10 carbon atoms in an amount 70–100% of that theoretically necessary to esterify the cellulose, chloroacetic anhydride and an acylation catalyst and subsequently treating the esterification mass containing the cellulose ester under substantially anhydrous conditions with acetic acid in a sufficient amount to extract at least a substantial amount in an uncombined fatty acid therefrom.

5. A method of preparing cellulose esters substantially all of the acyl of which consists of fatty acid radicals of at least 10 carbon atoms, which comprises esterifying the cellulose with a reaction mixture essentially consisting of a fatty acid of at least 10 carbon atoms in an amount 70 to 100 per cent of that theoretically necessary to esterify the cellulose, an impelling anhydride and a sulphuric acid catalyst, and subsequently treating the esterification mass containing the cellulose ester under substantially anhydrous conditions with an organic liquid selected from the group consisting of acetic acid and acetone in sufficient amount to extract at least a substantial proportion of the uncombined higher fatty acid therefrom.

GORDON D. HIATT.
CARLTON L. CRANE.